United States Patent
li et al.

(10) Patent No.: US 9,780,669 B2
(45) Date of Patent: Oct. 3, 2017

(54) INRUSH CONTROL POWER SUPPLY

(71) Applicant: Cisco Technology, Inc., San Jose, CA (US)

(72) Inventors: Yang li, San Jose, CA (US); Kan Seto, Saratoga, CA (US); Michael Grant, San Jose, CA (US); Matt Howard, San Jose, CA (US); Ruqi Li, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 165 days.

(21) Appl. No.: 14/987,789

(22) Filed: Jan. 5, 2016

(65) Prior Publication Data

US 2017/0194867 A1    Jul. 6, 2017

(51) Int. Cl.
*H02M 3/335*    (2006.01)

(52) U.S. Cl.
CPC .............................. *H02M 3/33507* (2013.01)

(58) Field of Classification Search
CPC ................................................ H02M 3/33507
See application file for complete search history.

(56) References Cited

U.S. PATENT DOCUMENTS

| 6,031,702 | A | 2/2000 | Williams | |
|---|---|---|---|---|
| 8,645,753 | B2 | 2/2014 | Yang et al. | |
| 8,716,997 | B2 | 5/2014 | Rao et al. | |
| 2014/0301123 | A1* | 10/2014 | Lee | H02M 7/5387 363/132 |
| 2015/0049525 | A1* | 2/2015 | Mu | H02M 7/53871 363/37 |
| 2015/0236617 | A1* | 8/2015 | Pahlevaninezhad | H02M 7/5387 363/132 |

OTHER PUBLICATIONS

International Rectifier: Datasheet: IRFP2907—75V Single N-Channel Hexfet Power Mosfet in A TO-247AC Package (Aug. 8, 2011).
O'Sullivan, Marcus: Understanding Hot Swap: Example of Hot-Swap Circuit Design Process. Analog Dialog. vol. 42—May 2008, Analog Devices.

* cited by examiner

*Primary Examiner* — Timothy J Dole
*Assistant Examiner* — Monica Mata
(74) *Attorney, Agent, or Firm* — Samuel M. Katz

(57) ABSTRACT

In one embodiment, a power apparatus includes a buck converter including a first capacitor, a first inductor and a first switch for connection with a direct current power supply, wherein when the first switch is closed and the buck converter is connected to the direct current power supply, the first capacitor and the first inductor are connected in series to the direct current power supply, a full-bridge inverter including at least four switches including the first switch, a second, third and fourth switch so that the first switch is shared by the inventor and buck converter, the inverter being operative to convert direct current to alternating current by alternating (a) closing the first and fourth switch with the second and third switch open, and (b) closing the second and third switch with the first and fourth switch open, and a transformer to step down an output of the inverter.

20 Claims, 4 Drawing Sheets

INRUSH CONTROL POWER SUPPLY

TECHNICAL FIELD

The present disclosure generally relates to power supply devices.

BACKGROUND

Many devices, such as networking and computing devices (e.g., servers, switches, disk arrays, etc.), require the ability to update or replace faulty equipment without interrupting the functioning of the rest of the system. For example, a device may have a backplane to which a number of removable computing modules can be coupled. During operation of the device, modules may be added, removed, or replaced, as needed (e.g., to increase functionality of the device, to replace a failing module, etc.). However, inrush currents may be relatively high when making such changes. To protect against such currents, a hot swap circuit may be used to regulate the inrush current to a module while making changes to the modules of the device.

A power system typically has three stages. The first stage is a hot swap circuit which typically uses a very large size metal-oxide-semiconductor field-effect transistor (MOSFET) (such as a TO-247 package MOSFET, for example, but not limited to, FDH210N08) to prevent a damaging inrush current. The second stage includes a power brick including a full bridge inverter, a transformer and a rectifier. The transformer isolates the input and output side of the power brick and also steps down the input voltage. The third stage is a point of load (POL) which steps down the output of the power brick to the correct level for supplying to different chips. The hot swap MOSFET has some disadvantages including the space it occupies, the cost, a hot swap controller to control the MOSFET and since the hot swap MOSFET is in series in the main circuit, the conduction loss on the hot swap MOSFET make the system efficiency lower.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

There is provided in accordance with an embodiment of the present invention, a power apparatus including a buck converter including a first capacitor, a first inductor and a first switch for connection with a direct current power supply, wherein when the first switch is closed and the buck converter is connected to the direct current power supply, the first capacitor and the first inductor are connected in series to the direct current power supply, a full-bridge inverter including at least four switches, the at least four switches including the first switch, a second switch, a third switch and a fourth switch so that the first switch is shared by the full-bridge inventor and the buck converter, the full-bridge inverter being operative to convert direct current to alternating current by alternating (a) closing the first switch and fourth switch with the second switch and third switch open, and (b) closing the second switch and third switch with the first switch and fourth switch open, and a transformer to step down an output of the full-bridge inverter.

DETAILED DESCRIPTION

Figure 1:
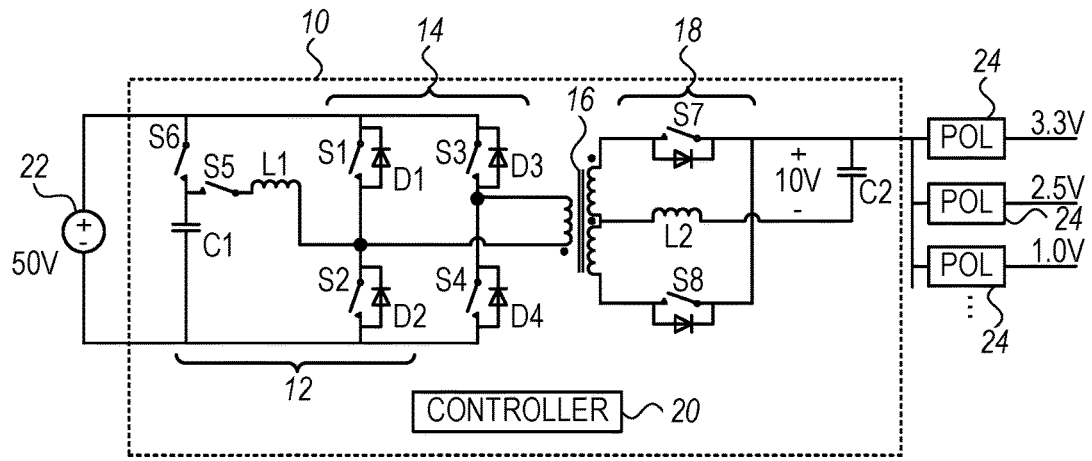
FIG. 1 is a view of an exemplary circuit diagram of a power device constructed and operative in accordance with an embodiment of the present disclosure.

Reference is now made to FIG. 1, which is a view of an exemplary circuit diagram of a power device 10 constructed and operative in accordance with an embodiment of the present disclosure. The power device 10 includes a buck converter 12, a full-bridge inverter 14, a transformer 16, a rectifier 18 (which may be optional if the final output desired is alternating current) and a controller 20.

The buck converter 12 includes a capacitor C1, an inductor L1 and a switch S1 for connection with a direct current power supply 22. The buck converter 12 also includes a switch S5 disposed between the capacitor C1 and the inductor L1 and another switch S6 disposed between the capacitor C1 and a connection to the direct current power supply 22. When the switches S1 and S5 are closed and the buck converter is connected to the direct current power supply 22, the capacitor C1 and the inductor L1 are connected in series to the direct current power supply 22 and the capacitor C1 charges to a voltage which is less than the voltage of the direct current power supply 22. The charging of the capacitor C1 of the buck converter 12 prior to the operation of the full-bridge inverter 14, transformer 16 and the rectifier 18 is described in more detail with reference to FIGS. 2-5. Capacitor C1 may have any suitable value. An example of a suitable component for capacitor C1 is a 47 µf, 63V aluminum electrolytic capacitor with an equivalent series resistance (ESR) of about 200 mOHM). An example of a suitable value for inductor L1 is 101. It will be appreciated that the rating of capacitor C1 and inductor L1 will depend on the voltage of the 22 direct current power supply 22 and the desired smoothing functionality of the buck converter 12. It should be noted that the voltage of the direct current power supply 22 is shown in FIG. 1 (and other figures) as being 50V. However, it will be appreciated that 50V is an example value only, and may be any suitable value, for example, but not limited to, 25V or 100V.

The full-bridge inverter 14 includes at least four switches, including the switch S1 and switches S2 to S4 so that the switch S1 is shared by the full-bridge inventor 14 and the buck converter 12. The full-bridge inverter 14 is operative to convert direct current to alternating current by alternating: (a) closing switches S1 and S4 with switches S2 and S3 open; and (b) closing switches S2 and S3 with switches S1 and S4 open. The full-bridge inverter 14 is not operated until capacitor C1 is charged to the voltage of the direct current power supply 22. Switches S1-S4 may be implemented using MOSFETs or any other suitable switching element. A MOSFET carries positive current from drain to source. If the load on the MOSFET is inductive, there are times when the switch (MOSFET) must be on, but current flows in the opposite direction. The anti-parallel diode gives this opposing current a path to flow. If the diode is not used, the inductive current ceases, typically generating high voltage peaks. Therefore, the full-bridge inverter 14 optionally includes at least four diodes, especially when switches S1-S4 are implemented using MOSFETs. The diodes include a diode D1, a diode D2, a diode D3 and a diode D4 disposed anti-parallel to switch S1, switch S2, switch S3 and switch S4, respectively. The diode D2 also enhances the functioning of the buck converter 12 as will be described in more detail with reference to FIG. 4.

The transformer 16 is operative to step down an output of the full-bridge inverter 14 to a lower voltage. The rectifier 18 is operative to convert an output of the transformer 16 from alternating current to direct current. The rectifier 18 typically includes a switch S7 and a switch S8. The switches S5-S8 are typically MOSFET enabled switches or any suitable switching element. The rectifier 18 also includes a capacitor C2 and an inductor L2 for current smoothing purposes. Operation of the full-bridge inverter 14 and the rectifier 18 is described in more detail with reference to FIGS. 6 and 7. The output of the rectifier 18 may be split between different points of load 24 where the output of the rectifier 18 may be stepped down further according to the different needs of the points of load 24. The voltages for the different points of load shown in the figures are by way of example only. The voltages may be any suitable value which is equal to or less than the voltage output of the transformer 16. The controller 20 is operative to open and close the switches S1-S8 as necessary according to four different modes of operation of the power device 10 as described in more detail with reference to FIGS. 2-7. The controller 20 may be implemented from any suitable integrated circuit as is known in the art. Having a single controller to control the switches of the buck converter 12, the full-bridge inverter 14 and the rectifier 18 may result in cost and space savings.

The operation of the power device 10 is now described in overview. In a first mode, described below in detail with reference to FIG. 3, switches S1 and S5 are closed while all the other switches are open. In the first mode the buck converter 12 pre-charges the capacitor C1 to a voltage V1 (e.g., 48V) which is less than the voltage of the direct current power supply 22 (e.g., 50V). In a second mode, described below in detail with reference to FIG. 4, switch S1 is opened and the potential difference across the inductor L1 drains via diode D2 to ground. In a third mode, described below in detail with reference to FIG. 5, switch S5 is opened and switch S6 is closed, increasing the potential difference across capacitor C1 from the voltage V1 (e.g., 48V) to a voltage V2 (e.g., 50V) which is equal to the voltage of the direct current power supply 22. In a fourth mode, described below in detail with reference to FIGS. 6 and 7, the switches S1-S4 of the full-bridge inverter 14 and the switches S7 and S8 of the rectifier 18 are operated yielding a stepped down voltage for the different points of load 24.

The buck converter 12 uses switch S1 and diode D2 of the full-bridge inverter 14 and the inductor L1 to pre charge capacitor C1 to the voltage V1. The pre-charging of the buck converter 12 prior to operating the full-bridge inverter 14, the transformer 16 and the rectifier 18 is to prevent damaging inrush currents.

As the switches of the buck converter 12 are not disposed in series with the full-bridge inverter 14, the switches (e.g., MOSFETs) of the buck converter 12 may be smaller and typically cheaper than switches (e.g., MOSFET(s)) used in hot swap circuits where the MOSFET(s) is in series with the full-bridge inverter 14. Additionally, there is no conduction loss in series with the full-bridge inverter 14 leading to better efficiency. Additionally, as the switches S1-S8 are typically controlled by the same controller 20, the buck converter 12 does require a dedicated hot swap controller providing space and cost savings. The buck converter 12 typically does not need the controller 20 to provide pulse width modulation (PWM) for controlling the switches of the buck converter 12.

Figure 2:
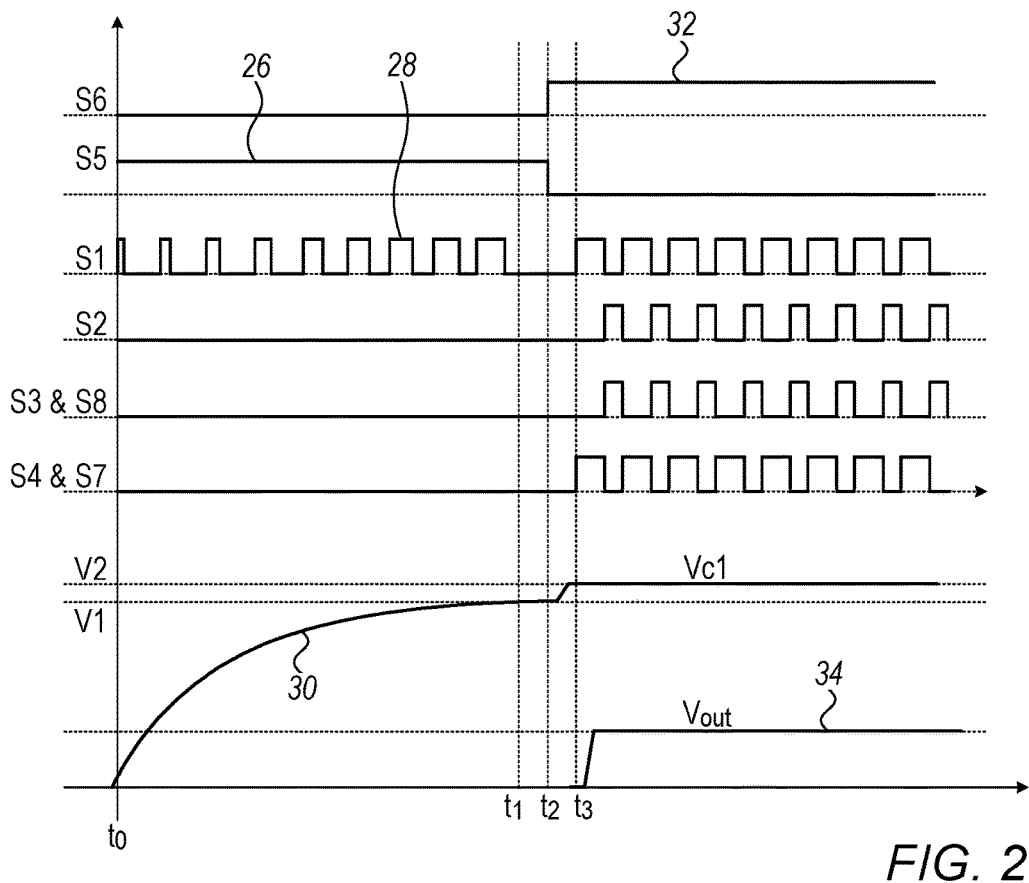
FIG. 2 is a chart showing actuation of the switches and voltage readings of the power device of FIG. 1.

Reference is now made to FIG. 2, which is a chart showing actuation of the switches by the controller 20 (FIG. 1) and voltage readings of the power device 10 of FIG. 1. FIG. 2 shows four time periods, time period 1 between t0 and t1, time period 2 between t1 and t2, time period 3 between t2 and t3 and time period 4 from t3, corresponding to modes 1 to 4 described above with reference to FIG. 1, respectively. In time period 1, switch S5 is closed (line 26) and switch 1 is opened and closed a multiplicity of times using a pulsed signal (line 28) which keeps switch S1 closed for longer periods slowly building up the voltage VC1 across capacitor C1 (FIG. 1) from 0V at time t0 to V1 (e.g., 48V) (line 30) at time t1. In time period 2, switch S1 is opened while switch S5 (line 26) is still closed. In time period 3, switch S6 is closed (line 32) while all the other switches are open. In this time period, the voltage VC1 across capacitor C1 increases from V1 (e.g., 48V) to V2 (e.g., 50V) (line 30). In time period 4, with switch S6 still being closed, switches S1-S4 and S7 and S8 are actuated to step down the input voltage to the full-bridge inverter 14 with switches S2, S3, S8 operating out of phase with switches S1, S4 and S7 yielding a stepped down output voltage Vout (e.g., 10V) (line 34) as described in more detail with reference to FIGS. 6 and 7. It should be noted that the voltage examples of 48V and 50V and 10V used in FIG. 2 are by way of example only. The voltage values will depend on the voltage of the direct current power supply 22 (FIG. 1) and the step down ratio of the transformer 16 (FIG. 1).

Figure 3:
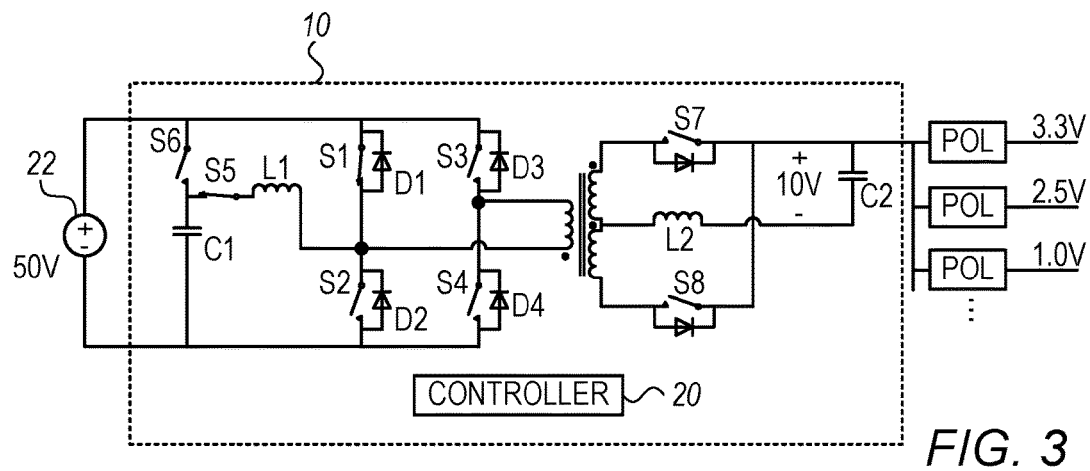
FIG. 3 is a view of the exemplary circuit diagram of FIG. 1 operating in accordance with a first mode of operation.

Reference is now made to FIG. 3, which is a view of the exemplary circuit diagram of FIG. 1 operating in accordance with mode 1 of operation of the power device 10 of FIG. 1. In mode 1, the controller 20 is operative to close switch S1 (typically according to a pulsed signal which opens and closes switch S1 repeatedly) and close switch S5 so that capacitor C1 and the inductor L1 are connected in series to the direct current power supply 22 and capacitor C1 charges to a voltage V1, e.g., 48V. During the time period of mode 1, the controller 20 is operative to leave the other switches open. In the time period of mode 1, the current through switch S5 is very small, for example, but not limited to, 10% of the input current, so switch S5 may have a low specification and be small in size. By way of example only, the BSZ058NO3LS which is an SON-8 MOSFET with a package size of 3×3 mm may be a suitable component for switch S5. The soft start of switch S5 may be around 10 ms, by way of example only. However, any suitable soft start value or MOSFET size may be used. In the example of FIG. 2, open control may be needed to enlarge the duty cycle of the signal actuating switch S1 from 0 to 0.96, so the voltage across capacitor C1 is charged from 0 to 0.96*50V=48V. It will be appreciated that the voltage amounts will change if the voltage of the direct current power supply 22 is different.

Figure 4:
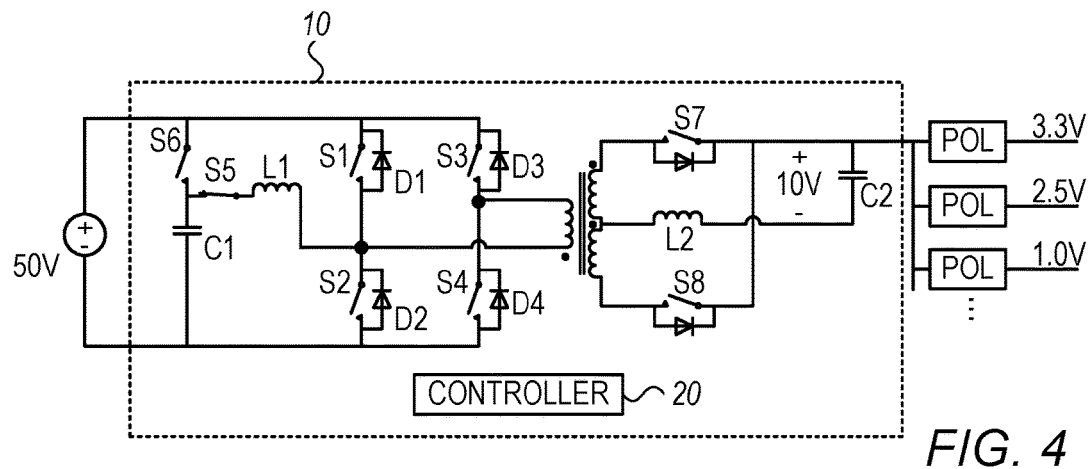
FIG. 4 is a view of the exemplary circuit diagram of FIG. 1 operating in accordance with a second mode of operation.

Reference is now made to FIG. 4, which is a view of the exemplary circuit diagram of FIG. 1 operating in accordance with mode 2 of operation of the power device 10 of FIG. 1. After the capacitor C1 has charged to the voltage V1, the controller 20 is operative to open switch S1. The controller 20 may use a differential amplifier to trigger switch S1 opening when the voltage across capacitor C1 reaches voltage V1. In mode 2, while switch S1 is open and switch S5 is still closed, the inductor L1 is operative to drain to ground via diode D2.

Figure 5:
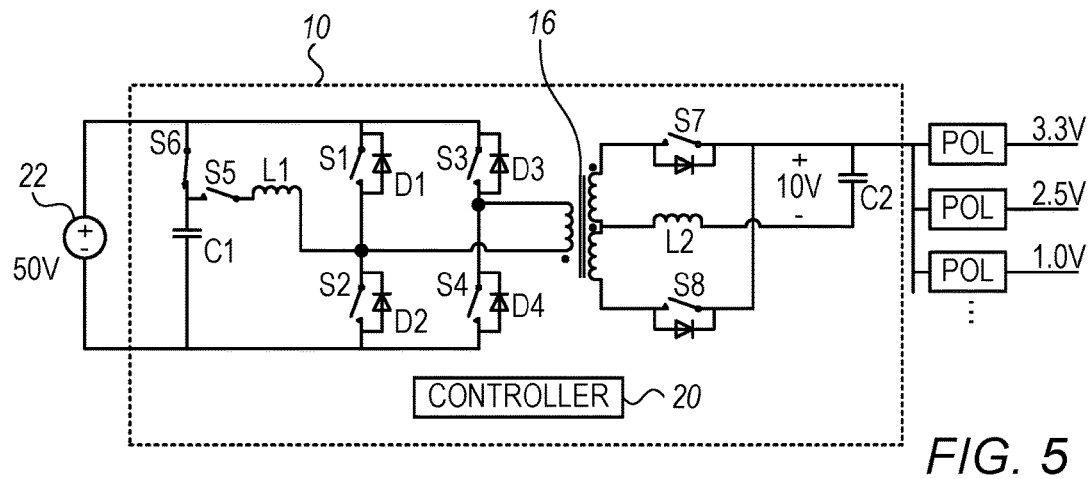
FIG. 5 is a view of the exemplary circuit diagram of FIG. 1 operating in accordance with a third mode of operation.

Reference is now made to FIG. 5, which is a view of the exemplary circuit diagram of FIG. 1 operating in accordance with mode 3 of operation of the power device 10 of FIG. 1. After capacitor C1 has charged to voltage V1 in mode 1, and switch S1 is opened in mode 2, the controller 20 is operative to, after a delay, for example, but not limited to several micro seconds from opening switch S1 while the inductor L1 drains to ground, open switch S5 and close switch S6 in mode 3 causing capacitor C1 to charge to voltage V2, typically equal to the voltage of the direct current power supply 22. The voltage V2 (FIG. 2) is greater than the voltage V1 (FIG. 2). Voltage V1 is greater than 95% of voltage V2 and typically greater than 97% or 98% of voltage V2 by way of example only. V1 may be any suitable percentage of V2. Since the voltage drop on switch S6 before it turns on is very small (2V in the example of FIG. 5), there is negligible inrush current when switch S6 is turned on. Therefore, switch S6 may have a low specification and be small in size. By way of example only, the BSZ058NO3LS which is an SON-8 MOSFET with a package size of 3×3 mm may be a suitable component for switch S6. It will be appreciated that the specification of suitable elements for switches S1-S8 will depend on the voltage of the direct current power supply 22 and the step down ratio of the transformer 16.

Figure 6:
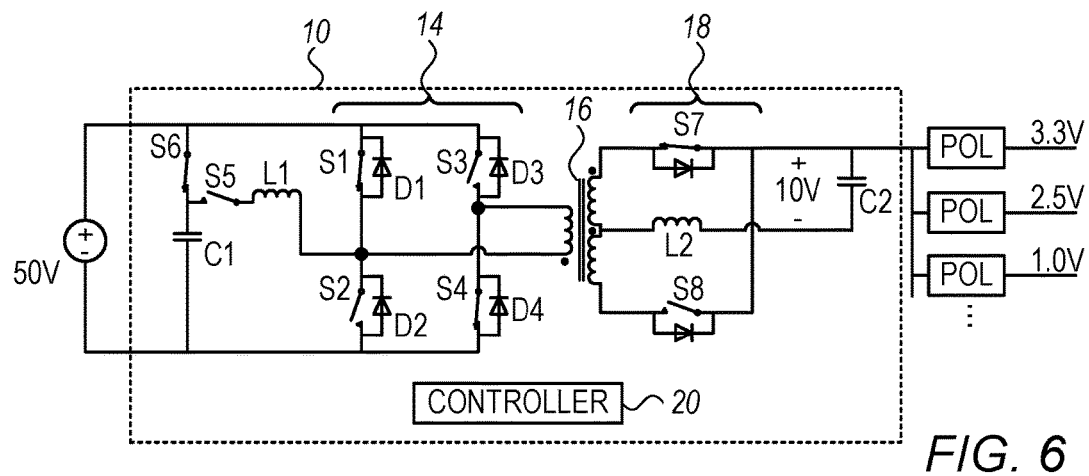
FIG. 6 is a view of the exemplary circuit diagram of FIG. 1 operating in accordance with a first cycle of a fourth mode of operation.
Figure 7:
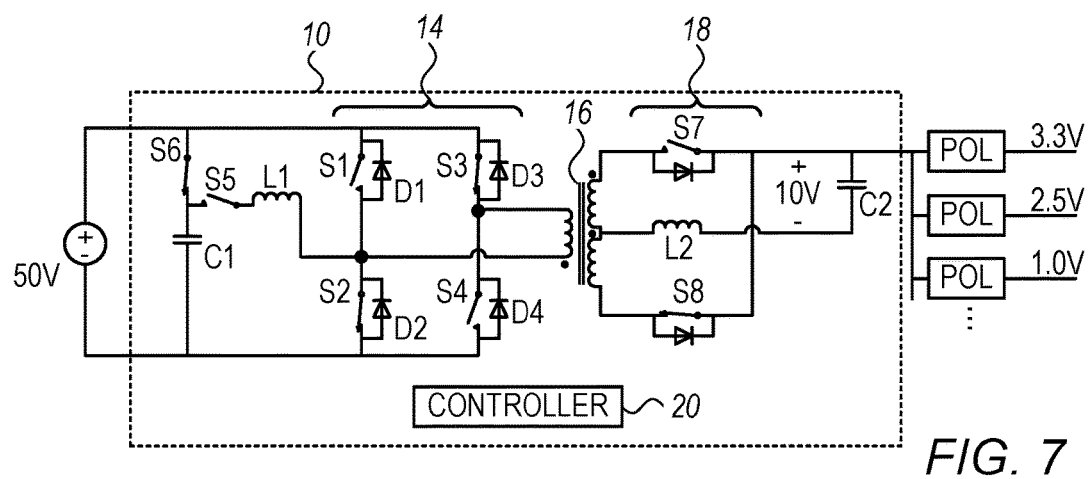
FIG. 7 is a view of the exemplary circuit diagram of FIG. 1 operating in accordance with a second cycle of the fourth mode of operation.

Reference is now made to FIG. 6, which is a view of the exemplary circuit diagram of FIG. 1 operating in accordance with a first cycle of mode 4 of operation of the power device 10 of FIG. 1. Reference is also made to FIG. 7, which is a view of the exemplary circuit diagram of FIG. 1 operating in accordance with a second cycle of the fourth mode of operation. After a delay, for example, but not limited to several micro seconds, from closing switch 6 in mode 3 to allow the voltage across the capacitor C1 to increase from V1 to V2, the controller 20 is operative to leave switch S6 closed and convert direct current to alternating current using the full-bridge inverter 14 and rectify the output of the transformer 16 using the rectifier 18 by alternating the following cycles: (a) closing switches S1, S4 and S7 with switches S2, S3 and S8 open (first cycle of mode 4 shown in FIG. 6); and (b) closing switches S2, S3 and S8 with the switches S1, S4 and S7 open (second cycle of mode 4 shown in FIG. 7). The frequency of the alternating of the cycles may be any suitable frequency that may be used to step down voltage by the transformer 16. It will be appreciated by one ordinarily skilled in the art that the rectifier 18 may be embodied as any suitable rectifier for example, using diodes instead of switches in either a half bridge or full bridge configuration.

Figure 8:
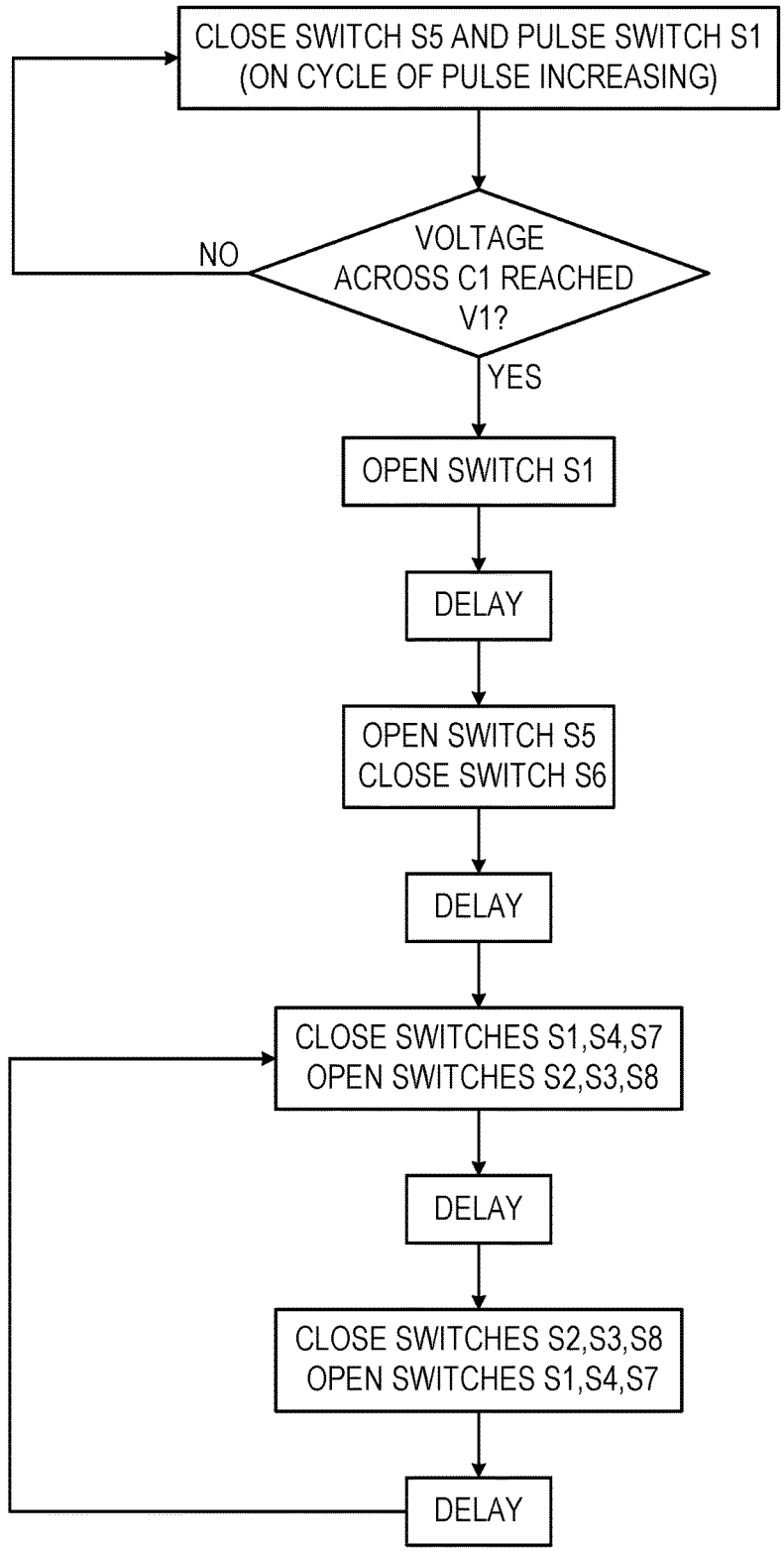
FIG. 8 is a flow chart for use in implementing an exemplary controller for use in the device of FIG. 1.

Reference is now made to FIG. 8, which is a flow chart for use in implementing an exemplary controller for use in the device of FIG. 1. The controller 20 (FIG. 1) may be constructed from suitable electronic components including differential amplifiers, pulse generators, logic gates and delay circuitry in order to implement the controller 20 to perform the functions described above with reference to FIGS. 1-7. The flow chart of FIG. 8 may be used for guidance in implementing the controller 20 using suitable electronic components.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination. It will be appreciated by persons skilled in the art that the present disclosure is not limited by what has been particularly shown and described hereinabove. Rather the scope of the disclosure is defined by the appended claims and equivalents thereof.

What is claimed is:

1. A power apparatus comprising:
a buck converter including a first capacitor, a first inductor and a first switch for connection with a direct current power supply, wherein when the first switch is closed and the buck converter is connected to the direct current power supply, the first capacitor and the first inductor are connected in series to the direct current power supply;
a full-bridge inverter including at least four switches, the at least four switches including the first switch, a second switch, a third switch and a fourth switch so that the first switch is shared by the full-bridge inventor and the buck converter, the full-bridge inverter being operative to convert direct current to alternating current by alternating: (a) closing the first switch and fourth switch with the second switch and third switch open; and (b) closing the second switch and third switch with the first switch and fourth switch open; and
a transformer to step down an output of the full-bridge inverter.

2. The apparatus according to claim 1, further comprising a controller operative to open and close switches including the first switch, the second switch, the third switch and the fourth switch.

3. The apparatus according to claim 2, wherein:
the controller is operative to close the first switch so that the first capacitor and the first inductor are connected in series to the direct current power supply and the first capacitor charges to a first voltage; and
while the controller is operative to close the first switch so that the first capacitor and the first inductor are connected in series to the direct current power supply, the controller is operative to leave the second switch, the third switch and fourth switch open.

4. The apparatus according to claim 3, further comprising a fifth switch disposed between the first capacitor and the first inductor, the controller being operative to close the fifth switch while the first capacitor is charging to the first voltage.

5. The apparatus according to claim 4, further comprising a sixth switch disposed between the first capacitor and a connection to the direct current power supply, the controller being operative to leave the sixth switch open while the capacitor is charging to the first voltage.

6. The apparatus according to claim 5, wherein after the capacitor has charged to the first voltage, the controller is operative to open the first switch and the fifth switch and close the sixth switch causing the capacitor to charge to a second voltage which is greater than the first voltage.

7. The apparatus according to claim 6, wherein the first voltage is greater than 95% of the second voltage.

8. The apparatus according to claim 6, wherein after the capacitor has charged to the first voltage, the controller is operative to open the first switch and after a first delay open the fifth switch and close the sixth switch causing the capacitor to charge to a second voltage which is greater than the first voltage.

9. The apparatus according to claim 8, wherein after a second delay after closing the sixth switch, the controller is operative to leave the sixth switch closed and convert direct current to alternating current by alternating: (a) closing the first switch and fourth switch with the second switch and third switch open; and (b) closing the second switch and third switch with the first switch and fourth switch open.

10. The apparatus according to claim 9, wherein the transformer is operative to step down the output of the full-bridge inverter to a third voltage, the apparatus further comprising a rectifier to convert an output of the transformer from alternating current to direct current.

11. The apparatus according to claim 10, wherein the rectifier includes a seventh switch and an eighth switch, the controller being operative to alternate: (a) closing the first switch, fourth switch and seventh switch with the second switch, third switch and eighth switch open; and (b) closing the second switch, third switch and eighth switch with the first switch, fourth switch open and seventh switch open.

12. The apparatus according to claim 6, further comprising at least four diodes including a first diode, a second diode, a third diode and a fourth diode disposed anti-parallel to the first switch, the second switch, the third switch and the fourth switch, respectively.

13. The apparatus according to claim 12, wherein after the capacitor has charged to the first voltage while the first switch is open and the fifth switch is still closed, the first inductor is operative to drain to ground via the second diode.

14. The apparatus according to claim 6, wherein after closing the sixth switch, the controller is operative to leave the sixth switch closed and convert direct current to alternating current by alternating: (a) closing the first switch and fourth switch with the second switch and third switch open; and (b) closing the second switch and third switch with the first switch and fourth switch open.

15. The apparatus according to claim 14, wherein the transformer is operative to step down the output of the full-bridge inverter to a third voltage, the apparatus further comprising a rectifier to convert an output of the transformer from alternating current to direct current.

16. The apparatus according to claim 15, wherein the rectifier includes a seventh switch and an eighth switch, the controller being operative to alternate: (a) closing the first switch, fourth switch and seventh switch with the second switch, third switch and eighth switch open; and (b) closing the second switch, third switch and eighth switch with the first switch, fourth switch open and seventh switch open.

17. The apparatus according to claim 1, wherein the transformer is operative to step down the output of the full-bridge inverter to a third voltage, the apparatus further comprising a rectifier to convert an output of the transformer from alternating current to direct current.

18. A method comprising:
operating a circuit including: a buck converter including a first capacitor, a first inductor and a first switch for connection with a direct current power supply, wherein when the first switch is closed and the buck converter is connected to the direct current power supply, the first capacitor and the first inductor are connected in series to the direct current power supply; a full-bridge inverter including at least four switches, the at least four switches including the first switch, a second switch, a third switch and a fourth switch so that the first switch is shared by the full-bridge inventor and the buck converter, the full-bridge inverter being operative to convert direct current to alternating current by alternating: (a) closing the first switch and fourth switch with the second switch and third switch open; and (b) closing the second switch and third switch with the first switch and fourth switch open; a fifth switch disposed between the first capacitor and the first inductor; and a transformer to step down an output of the full-bridge inverter; and closing the first switch and fifth switch so that the first capacitor and the first inductor are connected in series to the direct current power supply and the first capacitor charges to a first voltage; and while the first switch and fifth switch are closed so that the first capacitor and the first inductor are connected in series to the direct current power supply, leaving the second switch, the third switch and fourth switch open.

19. The method according to claim 18, wherein the circuit also includes a sixth switch disposed between the first capacitor and a connection to the direct current power supply, the method further comprising leaving the sixth switch open while the capacitor is charging to the first voltage.

20. The method according to claim 19, further comprising:
after the capacitor has charged to the first voltage, opening the first switch and the fifth switch and closing the sixth switch causing the capacitor to charge to a second voltage which is greater than the first voltage; and then
converting direct current to alternating current by alternating: (a) closing the first switch and fourth switch with the second switch and third switch open; and (b) closing the second switch and third switch with the first switch and fourth switch open.

* * * * *

UNITED STATES PATENT AND TRADEMARK OFFICE
CERTIFICATE OF CORRECTION

PATENT NO. : 9,780,669 B2  Page 1 of 1
APPLICATION NO. : 14/987789
DATED : October 3, 2017
INVENTOR(S) : Yang Li et al.

It is certified that error appears in the above-identified patent and that said Letters Patent is hereby corrected as shown below:

In the Specification

Column 2, Line 46, "L1 is 101." to read as --L1 is 1µH.--.

Column 4, Line 52, "BSZ058NO3LS" to read as --BSZ058N03LS--.

Column 5, Line 24, "BSZ058NO3LS" to read as --BSZ058N03LS--.

Signed and Sealed this
Fourteenth Day of November, 2017

Joseph Matal
*Performing the Functions and Duties of the
Under Secretary of Commerce for Intellectual Property and
Director of the United States Patent and Trademark Office*